US006977783B2

(12) United States Patent
Lung

(10) Patent No.: US 6,977,783 B2
(45) Date of Patent: Dec. 20, 2005

(54) LENS MODULE AND ASSEMBLING METHOD THEREOF

(75) Inventor: Chien-Lih Lung, Taipei (TW)

(73) Assignee: Premier Image Technology Corporation, Taipei (TW)

( * ) Notice: Subject to any disclaimer, the term of this patent is extended or adjusted under 35 U.S.C. 154(b) by 0 days.

(21) Appl. No.: 10/890,115

(22) Filed: Jul. 14, 2004

(65) Prior Publication Data

US 2005/0237637 A1 Oct. 27, 2005

(30) Foreign Application Priority Data

Apr. 23, 2004 (TW) ................................ 93111513 A

(51) Int. Cl.$^7$ .......................... G02B 7/02; H04N 5/225; H04N 1/04; H01J 40/14; H01L 27/00
(52) U.S. Cl. ...................... 359/819; 359/818; 348/340; 348/274; 250/239; 250/216; 250/208.1; 358/474
(58) Field of Search ........................ 359/819, 811, 818, 359/822, 823; 348/274, 311, 340, 294; 250/239, 250/216, 208.1; 358/474, 475, 509; 396/6

(56) References Cited

U.S. PATENT DOCUMENTS 6,483,101 B1 * 11/2002 Webster ...................... 250/216
6,483,652 B2 * 11/2002 Nakamura ................... 359/819
6,654,187 B2 * 11/2003 Ning ........................... 359/823
6,683,298 B1 * 1/2004 Hunter et al. ................ 250/239
6,727,431 B2 * 4/2004 Hashimoto .................. 174/52.2
6,741,405 B1 * 5/2004 Chen ........................... 359/813
6,791,076 B2 * 9/2004 Webster ...................... 250/239
6,900,913 B2 * 5/2005 Chen ........................... 358/474

* cited by examiner

Primary Examiner—Loha Ben
(74) Attorney, Agent, or Firm—Troxell Law Office, PLLC

(57) ABSTRACT

A lens module has a module body and a mating receptacle. The module body has a lens unit and an image sensing and processing unit, the image sensing and processing unit receiving light beams from the lens unit and producing an image signal. The mating receptacle is made of insulating material, which is detachably engaged with the module body and has conductive terminals formed therein for transmitting the image signal. An assembling method of the lens module includes the following steps. First, the mating receptacle is installed on a printed circuit board of an electronic device by a surface mounting technology. Second, the module body is installed in the mating receptacle to implement electrical interconnection between the module body and the printed circuit board.

16 Claims, 8 Drawing Sheets

LENS MODULE AND ASSEMBLING METHOD THEREOF

BACKGROUND OF THE INVENTION

1. Field of the Invention

The present invention relates to a lens module and an assembling method thereof, and more particularly, to a lens module and an assembling method thereof capable of achieving an electrical interconnection with a printed circuit board of an electronic device through a mating receptacle.

2. Description of Prior Art

Nowadays, the mass-production of a lens module that is widely applied in an electronic device with a photograph function (such as a mobile phone with a photograph function or a personal digital assistant (PDA) with a photograph function), generally suffers from the disadvantage of a relatively high defect rate.

Referring to FIG. 1 and FIG. 2, a conventional lens module 1 comprises a lens unit 11, a base 12, an image sensor 131, a fixing substrate 14 and a flexible printed circuit board (FPCB) 13. The base 12 holds the lens unit 11 and has a top opening for introducing exterior light beams into the image sensor 131 formed on the fixing substrate 14 via the lens unit 11. The image sensor 131 generates an image signal that is transmitted to a printed circuit board of an electronic device (such as a printed circuit board 101 of a camera 100 shown in FIG. 3) by the flexible printed circuit board 13.

However, in order to output the image signal, a flexible printed circuit board must be used in the conventional lens module 1, thereby preventing the lens module 1 from being directly mounted on the printed circuit board of an electronic device in an automatic, mass-production manner, and keeping the cost thereof high.

Therefore, the present invention provides an improved lens module and an assembling method thereof that can overcome or at least reduce the disadvantages set forth above.

SUMMARY OF THE INVENTION

In accordance with one aspect of the present invention, a lens module is provided, which is capable of achieving an electrical interconnection with a printed circuit board of an electronic device, comprising a module body and a mating receptacle. The module body has a lens unit and an image sensing and processing unit; the image sensing and processing unit receives light beams from the lens unit and produces an image signal. The mating receptacle is made of insulating material, which is detachably engaged with the module body and has conductive terminals formed therein for transmitting the image signal.

In accordance with another aspect of the present invention, an assembling method of a lens module is provided, and comprises the following steps. First, the lens module is divided into a module body and a mating receptacle electrically interconnected with the module body. The module body has a lens unit and an image sensing and processing unit. The mating receptacle has conductive terminals for transmitting an image signal produced from the image sensing and processing unit. Second, the mating receptacle is installed onto a printed circuit board of an electronic device. Finally, the module body is installed in the mating receptacle so as to implement electrical interconnection between the module body and the printed circuit board. The present invention shortens an assembly procedure that involves the module body, reduces the possibility of contamination of and shock to the lens module, and improves the yield rate of the production.

BRIEF DESCRIPTION OF THE DRAWINGS

Other objects, advantages, and novel features of the present invention will become more apparent from the following detailed description when taken in conjunction with the accompanying drawings, in which.

DETAILED DESCRIPTION OF THE INVENTION

Referring to FIG. 4 to FIG. 7, a lens module 200 of the present invention includes a module body 2 and a mating receptacle 3.

Figure 1:
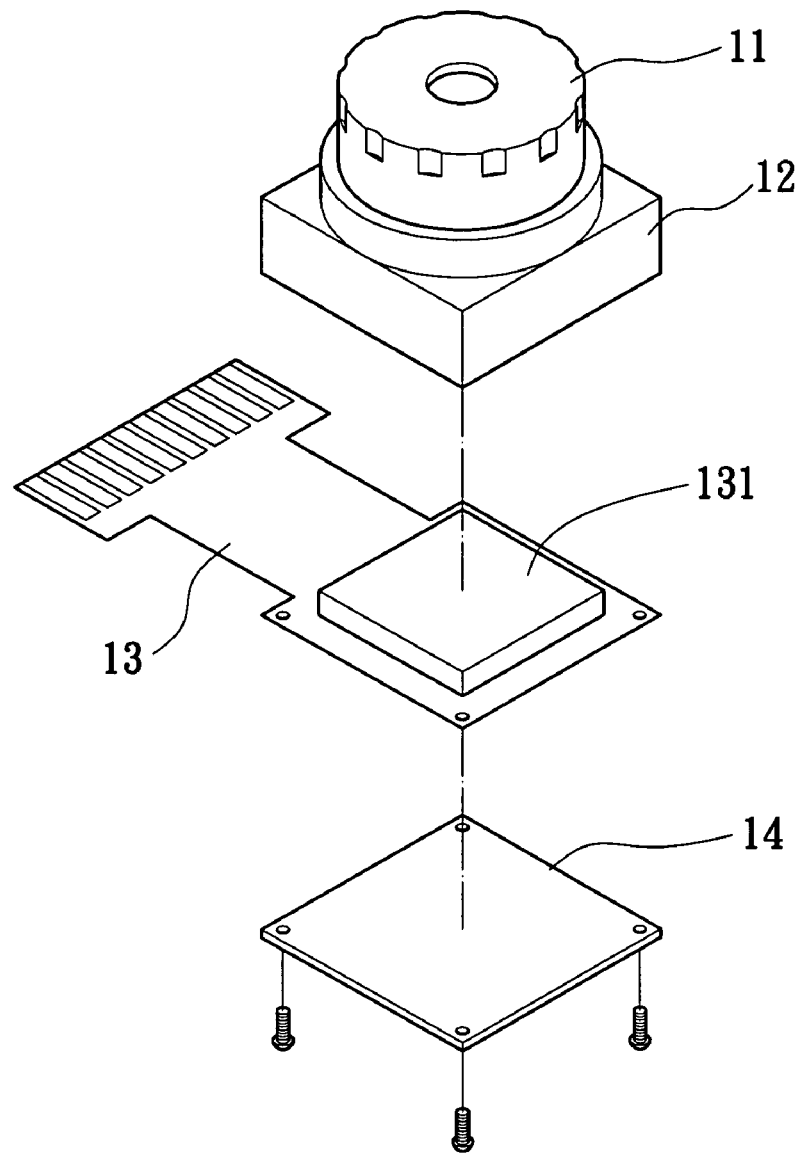
FIG. 1 is an exploded perspective view of a conventional lens module.
Figure 2:
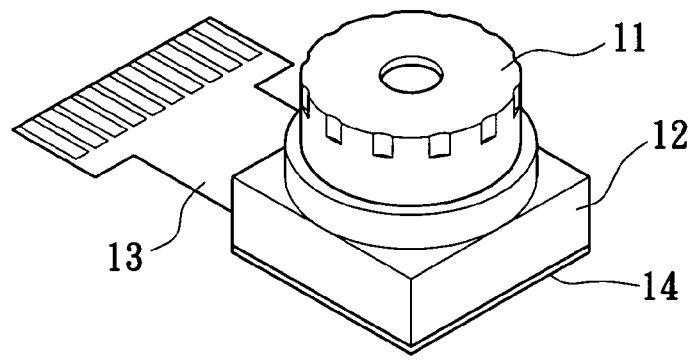
FIG. 2 is an assembled perspective view of the conventional lens module.
Figure 3:
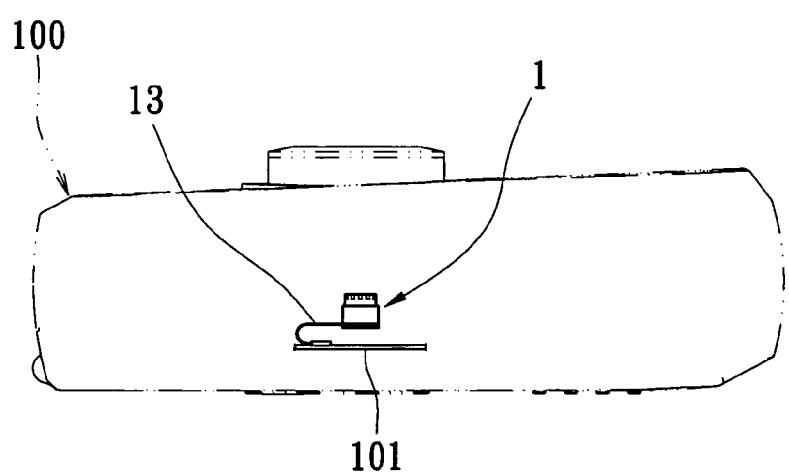
FIG. 3 shows an applying embodiment of the convention lens module, which is applied in a camera.
Figure 4:
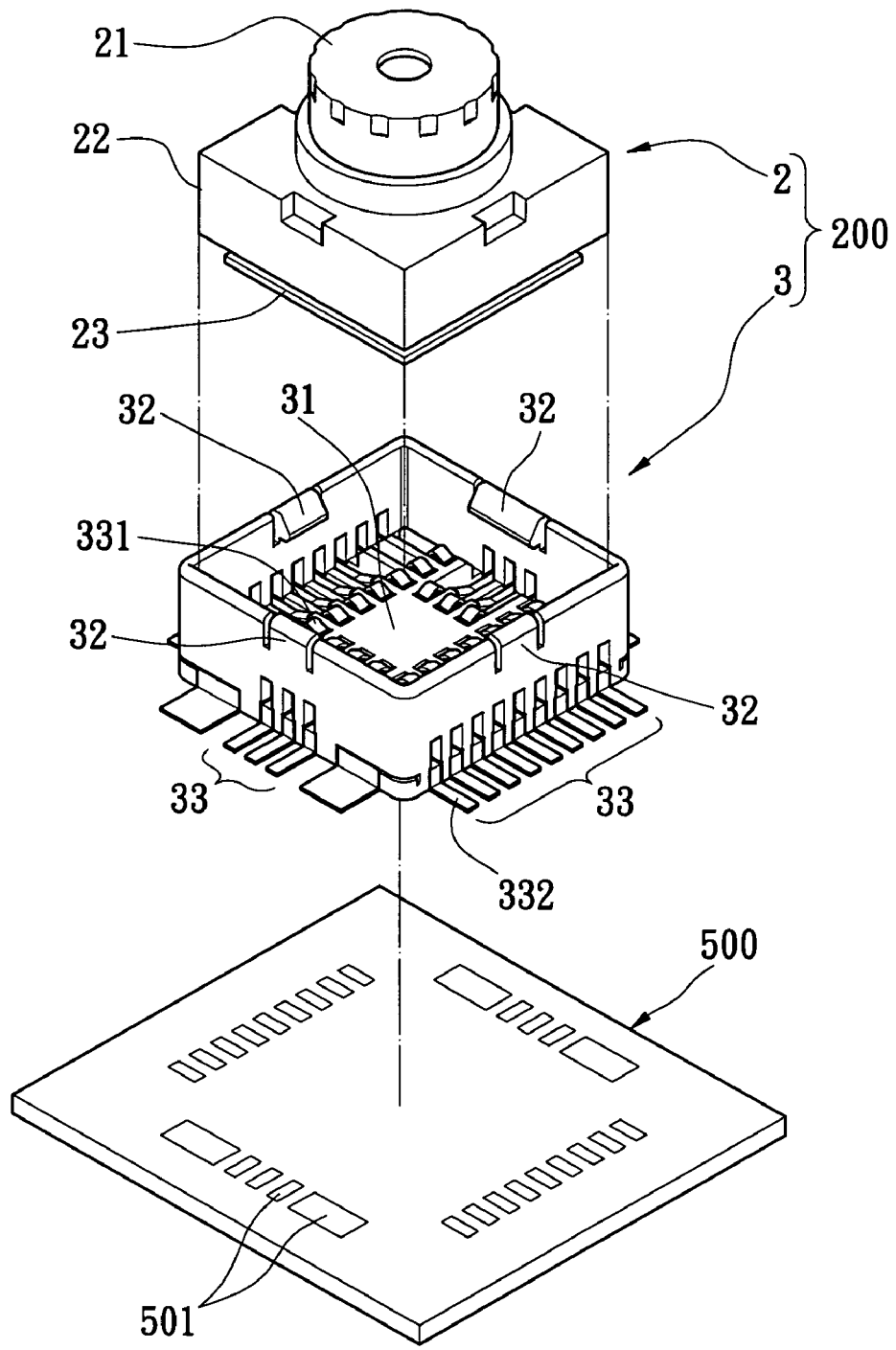
FIG. 4 is an exploded perspective view of a lens module according to the present invention.
Figure 5:
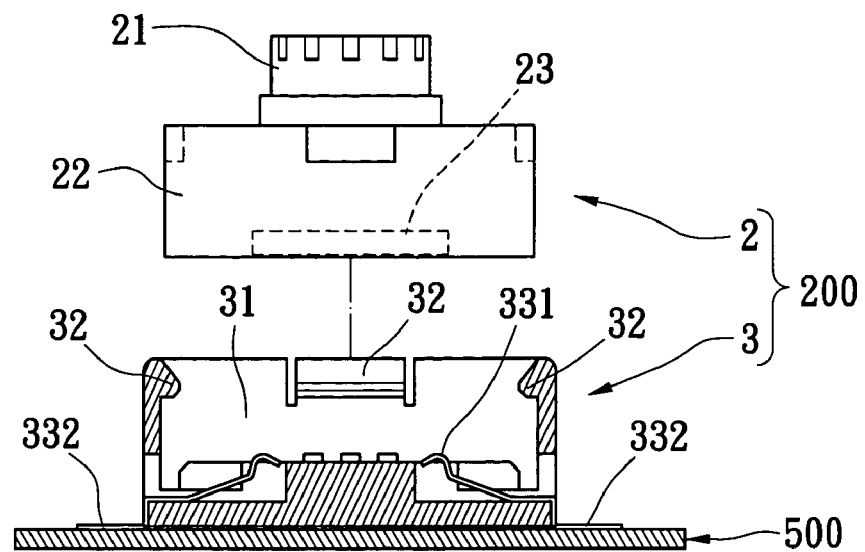
FIG. 5 is a partial, cross-sectional view of the lens modules of the present invention.
Figure 6:
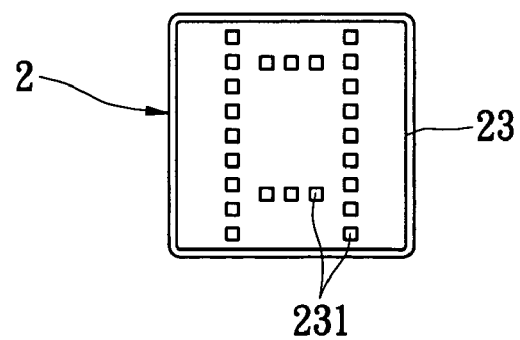
FIG. 6 is a bottom view of a module body of the lens module of the present invention.
Figure 7:
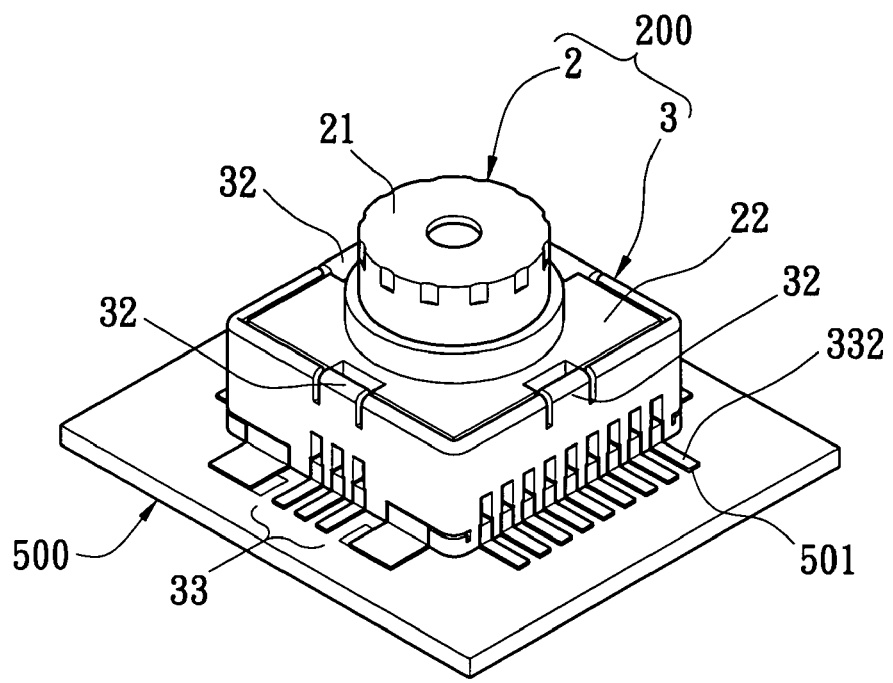
FIG. 7 is an assembled perspective view of the lens module of the present invention.

The module body 2 uses a base 22 to receive a lens unit 21, an image sensing and processing unit 23 and a plurality of conductive terminals 231 (as shown in FIG. 6).

The mating receptacle 3 is made of a conventional insulating material, which has a positioning groove 31 and a plurality of conductive terminals 33. In assembly, the positioning groove 31 guides the module body 2 to be positioned quickly, thereby finishing an electrical interconnection between inner ends 331 of the terminals 33 and the terminals 231 accurately, and causing outer ends 332 of the terminals 33 to connect electrically to corresponding welds 501 of a printed circuit board 500. More preferably, fastening members 32 are defined on the mating receptacle 3 for fastening the module body 2. In other words, the mating receptacle 3 and the module body 2 are detachably engaged with each other so that the electrical interconnection between the inner ends 331 of the conductive terminals 33 and the conductive terminals 231 becomes more stable and reliable.

The installation of the lens module 200 includes the following steps. First, the outer ends 332 of the conductive terminals 33 of the mating receptacle 3 are electrically connected to the printed circuit board 500 via a surface mounting technology. Second, the module body 2 are fastened on or connected to the mating receptacle 3. Consequently, exterior light beams can be introduced into via the lens unit 21, resulting in an image signal being produced from the image sensing and processing unit 23. The image signal is transmitted to the printed circuit board 500 by the terminals 231 and the terminals 33 of the mating receptacle 3.

Figure 8:
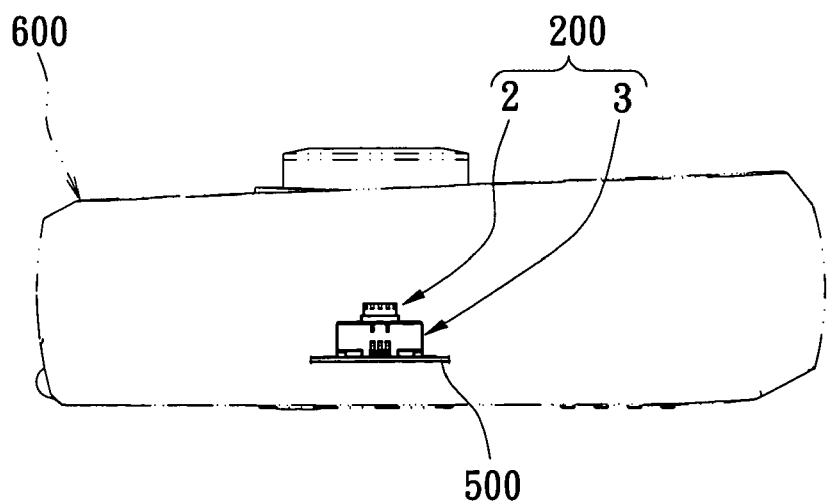
FIG. 8 shows an embodiment of the lens module of the present invention, applied in a camera.

Referring to FIG. 8, in this embodiment according to the present invention, the printed circuit board 500 is an inner printed circuit board of a digital camera 600 or other type of electrical product with a photograph function. The image signal as described above can be stored in a memory unit of the digital camera 600 through the printed circuit board 500. Conversely, the image signal is displayed by, for example a display of the digital camera 600.

Figure 9:
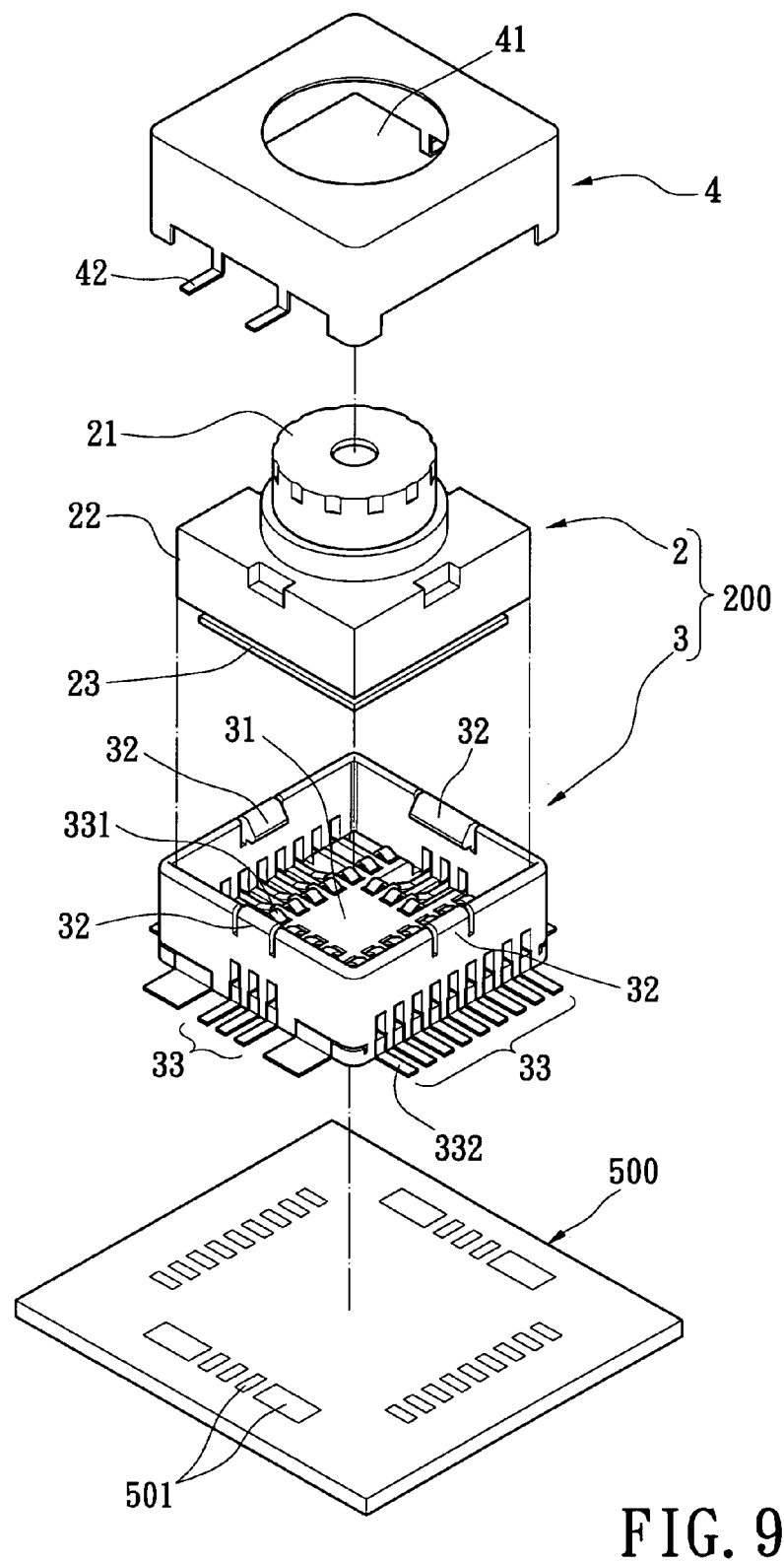
FIG. 9 is an exploded perspective view of an embodiment of a lens module according to the present invention.

Referring to FIG. 9, the present invention further comprises a metal shield 4 for covering the lens module 200 so as to decrease electromagnetic interference. The metal shield 4 includes an opening 41 exposing the lens unit 21. More preferably, the metal shield 4 further has a grounding terminal 42 adapted to connect to the printed circuit board 500 for providing a grounding function, thereby decreasing electromagnetic interference.

Figure 10:
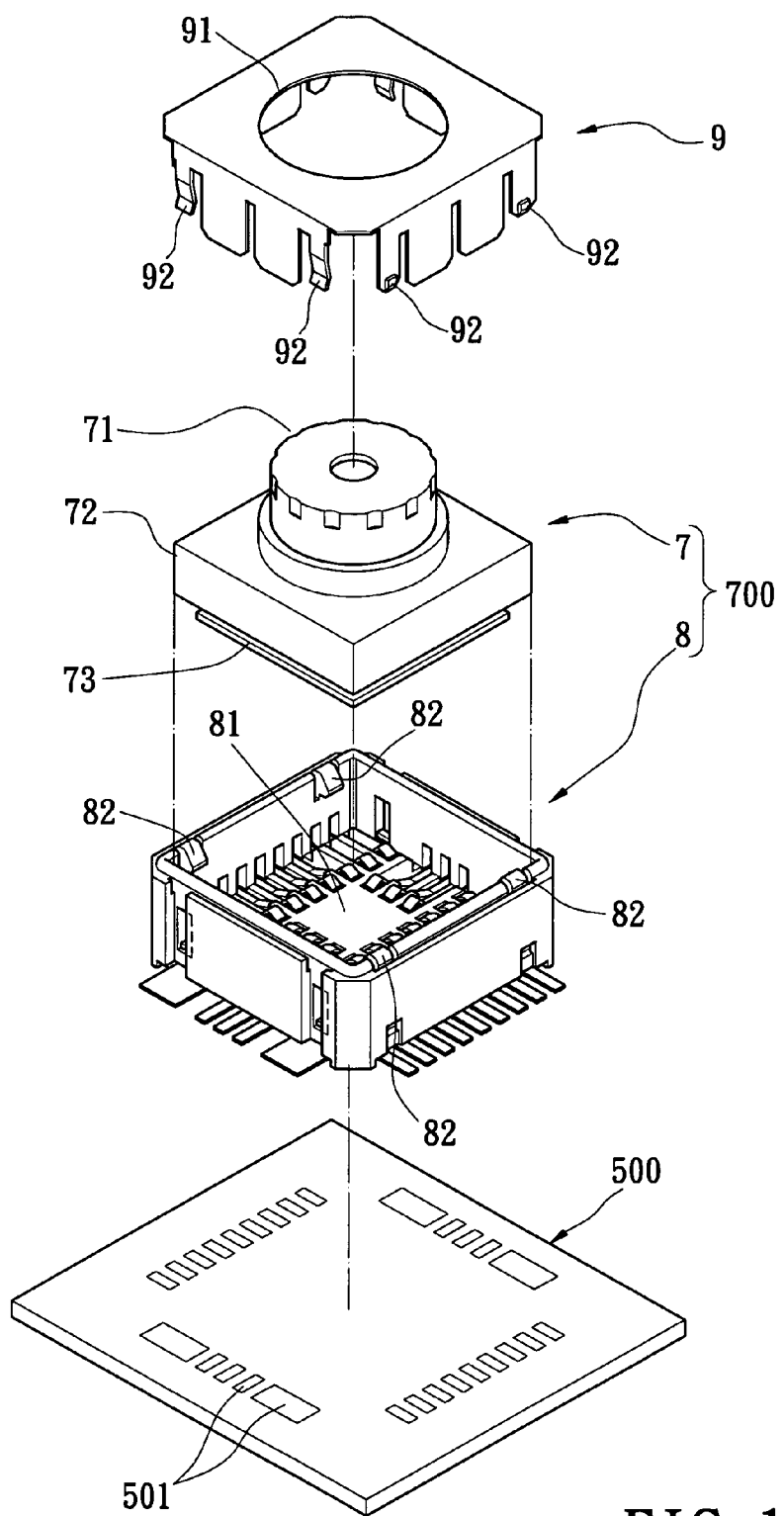
FIG. 10 is an exploded perspective view of another embodiment of a lens module according to the present invention.
Figure 11:
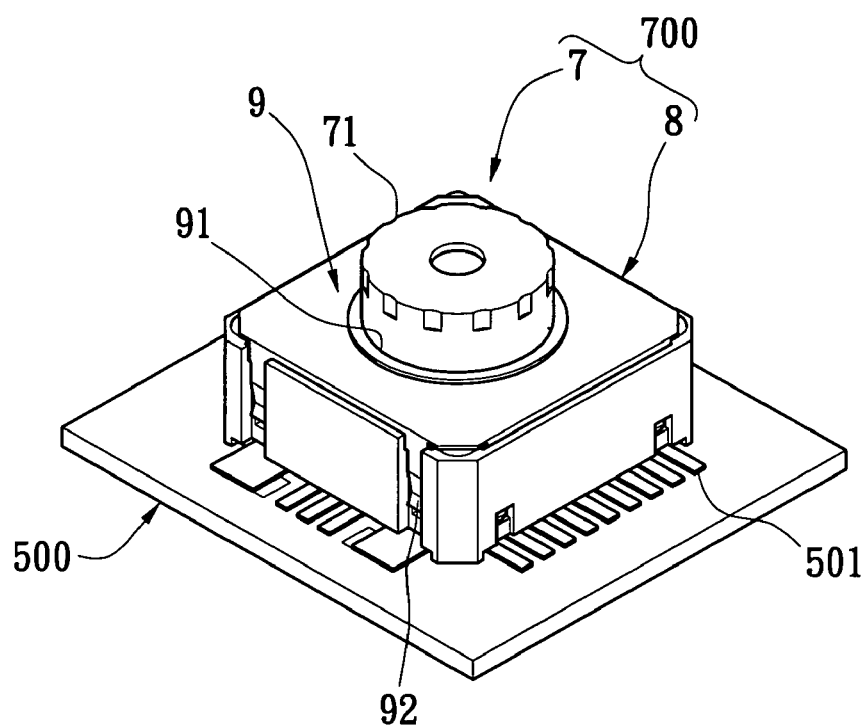
FIG. 11 is an exploded perspective view of another embodiment of a lens module according to the present invention.

FIG. 10 and FIG. 11 illustrate a lens module 700 according to another embodiment of the present invention, which also has a metal shield 9 for decreasing electromagnetic interference.

The lens module 700 also includes a module body 7 and a mating receptacle 8. The module body 7 has a lens unit 71, a base 72 and an image sensing and processing unit 73. The mating receptacle 8 has a positioning groove 81 and fastening elements 82. By guiding of the positioning groove 81, the module body 7 is positioned in a proper place and further fastened by the fastening elements 82.

The metal shield 9 has an opening 91 and fastening portions 92. Exterior light beams pass through the opening 91 and enter into the lens unit 71. The metal shield 9 is fastened on the mating receptacle 8 by the fastening portions 92. Thus, the lens module 700 can be protected from electromagnetic interference with the metal shield 9.

Of course, the present invention has other embodiments. For example, a dowel pin (not shown) or a position post (not shown) that is generally used in a common mechanism design can be used instead of the positioning groove 31, 81 of the present invention. The fastening elements 32, 82 also can be replaced with adhesive, conventional clamping elements or other elements that can provide a fastening function. The metal shields 4, 9 can further comprise metal grids or holes (not shown) so as to achieve double functions of dispersing heat and blocking an electromagnetic interference.

As mentioned above, the assembling method and the structure of the lens module in accordance with the present invention have the following advantages.

1. The present invention leaves out the FPCB 13 that is necessary in the prior art, thereby saving material cost.

2. Before the lens unit 2 (7) is inserted into the mating receptacle 3 (8) of the lens module 200 (700), the mating receptacles 3, 8 are easily and automatically mounted on the printed circuit board 500 of an electronic device by conventional surface mounting technology. Thus, the chance that the lens module 200 (700) is stained with dirt or loses its precision because of shaking is decreased. Compares with the conventional structure, this design is much more suitable for mass production and much more easily improves yield rate of products.

3. The present invention can decrease electromagnetic interference to the lens module 200 (700) with the metal shield 4 (9).

The invention has been explained in relation to some of its preferred embodiments. It is to be understood that many other possible modifications and variations can be made without departing from the spirit and scope of the invention as hereinafter claimed.

What is claimed is:

1. A method for assembling a lens module, comprising the steps of:
   providing a module body and a mating receptacle, wherein the module body includes a lens unit and an image sensing and a processing unit, and wherein the mating receptacle includes a plurality of conductive terminals for receiving an image signal generated from the image sensing and processing unit;
   mounting and electrically connecting the mating receptacle with a printed circuit board; and
   connecting the module body with the mating receptacle for transmitting the image signal through the conductive terminals to the printed circuit board.

2. The method as claimed in claim 1, wherein the mating receptacle is mounted on the printed circuit board by a Surface Mounting Technology (SMT).

3. The method as claimed in claim 1, wherein the mating receptacle has a positioning groove for quick positioning the module body.

4. The method as claimed in claim 1, wherein the mating receptacle and the module body are firmly fastened together via a fastening element.

5. The method as claimed in claim 1, wherein the mating receptacle and the module body are clamped together firmly via a clamping element.

6. A lens module for achieving an electrical interconnection with a printed circuit board of an electronic device, comprising:
   a module body having a lens unit and an image sensing and processing unit, and the image sensing and processing unit for receiving a light through the lens unit to generate an image signal; and
   a mating receptacle made of an insulating material, the mating receptacle being detachably engaged with the module body and having a plurality of conductive terminals for transmitting the image signal.

7. The lens module as claimed in claim 6, wherein the mating receptacle has a positioning groove for quick positioning the module body.

8. The lens module as claimed in claim 6, wherein the mating receptacle has a dowel pin for quick positioning the module body.

9. The lens module as claimed in claim 6, wherein the mating receptacle has a fastening element for fastening the module body.

10. The lens module as claimed in claim 6, wherein the mating receptacle is electrically connected with the printed circuit board of the electronic device by a Surface Mounting Technology (SMT).

11. The lens module as claimed in claim 6, wherein the conductive terminals of the mating receptacle have outer ends for soldering on corresponding welds of the printed circuit board of the electronic device.

12. The lens module as claimed in claim 6, further comprising a metal shield for covering the module body to prevent and/or reduce potential influence caused by an Electromagnetic Interference (EMI).

13. The lens module as claimed in claim 12, wherein the metal shield has an opening for providing exterior light beams into the lens unit.

14. The lens module as claimed in claim 12, wherein the metal shield has a fastening portion for engaging with the module body or the mating receptacle.

15. The lens module as claimed in claim 12, wherein the metal shield has a grounding terminal to connect with the printed circuit board of the electronic device to provide a grounding function.

16. The lens module as claimed in claim 12, wherein the metal shield has a metal grid or a plurality of holes to dissipate heat and prevent the Electromagnetic Interference (EMI).

* * * * *